Aug. 19, 1969  A. W. BUTLER ETAL  3,462,087
FLAKING MACHINE
Filed Jan. 20, 1966
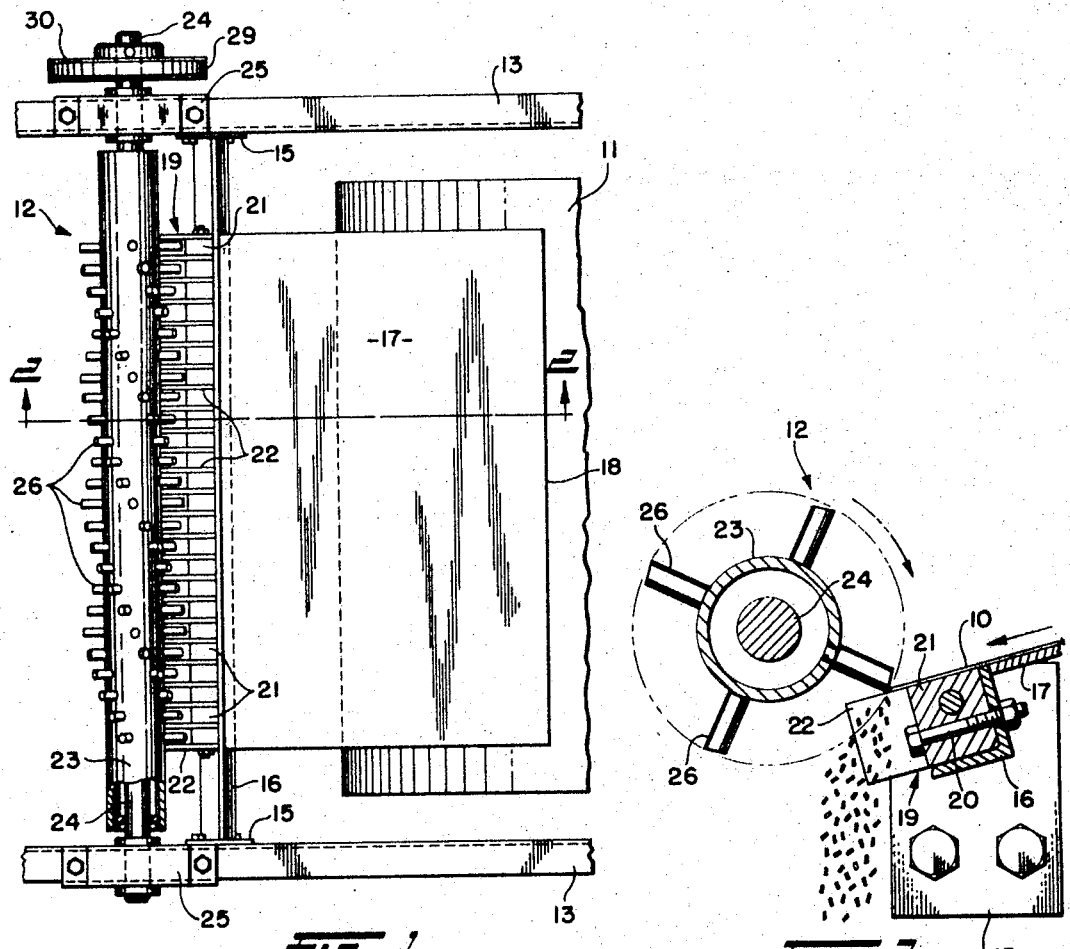
Fig. 1
Fig. 3
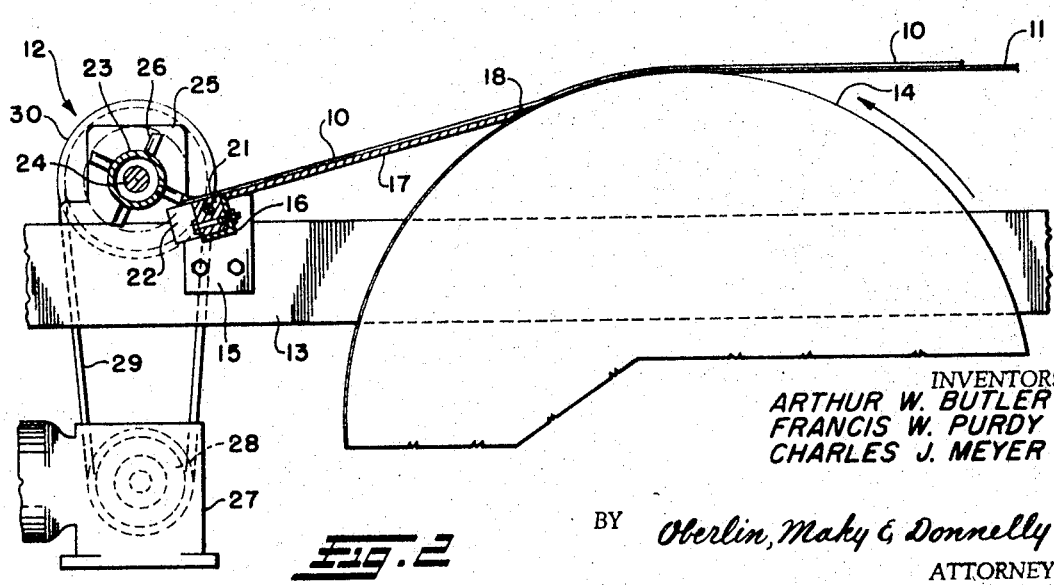
Fig. 2
INVENTORS
ARTHUR W. BUTLER
FRANCIS W. PURDY
CHARLES J. MEYER
BY *Oberlin, Maky & Donnelly*
ATTORNEYS //
United States Patent Office 3,462,087
Patented Aug. 19, 1969

3,462,087
FLAKING MACHINE
Arthur W. Butler, Garfield Heights, Francis W. Purdy, Maple Heights, and Charles J. Meyer, Bay Village, Ohio, assignors to The Standard Oil Company, Cleveland, Ohio, a corporation of Ohio
Filed Jan. 20, 1966, Ser. No. 521,971
Int. Cl. B02c 23/02, 13/00
U.S. Cl. 241—186                                    3 Claims

ABSTRACT OF THE DISCLOSURE

Apparatus for the continuous flaking of wax sheet and the like advanced along a conveyor and transferred by a scraper blade to breaking mechanism including a comb onto which the leading edge of the sheet moves and a rotor having pins rotating through the comb to fracture the sheet. The feed of the sheet is at a controlled rate, with the pins striking the sheet at a small angle to avoid significant drag and also having rearwardly sloped ends so that only the leading edges of the rotating pins strike the sheet.

---

This invention relates, as indicated, to flaking machinery and, more particularly, to a machine for converting material such as wax in sheet or large flake form to flakes of predetermined and relatively smaller size.

It is a primary object of the invention to provide a machine on this order which is of economical construction and yet capable of breaking or fracturing the wax and the like into flakes of uniform dimensions, with the material fed to the machine for continuous operation. It is also an object to provide a continuously operating flaking machine in which the material feed is established and controlled in such manner as to ensure clean and uniform breaking thereof, with improved regularity or uniformity of the thus produced flakes.

Other objects and advantages of the present invention will become apparent as the following description proceeds.

To the accomplishment of the foregoing and related ends the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

In said annexed drawing:

FIG. 1 is a top plan view of a flaking machine in accordance with the present invention in association with a material feeding conveyor shown fragmented;

FIG. 2 is a vertical cross-section of the flaker as viewed from the plane of the line 2—2 in FIG. 1; and FIG. 3 is a fragmented and simplified vertical section on an enlarged scale.

Referring now to the drawing in detail, the illustrated flaker is designed especially for converting solid wax in sheet form and this material is shown as a continuous sheet 10 carried by a suitable belt conveyor 11 from a supply station, not shown, to the flaker or breaker designated generally by reference numeral 12. The sheet can be formed, for example, by applying wax in a heated liquid state to the conveyor and permitting it to cool thereon so that it is in the solid continuous state by the time it reaches the discharge end of the conveyor at which the flaker is located.

The flaking machine includes a pair of horizontal support rails 13 respectively at the sides of the end drum or roller 14 of the belt conveyor at its discharge end, with such rails adjacent the upper portion of the drum and extending outwardly beyond the conveyor end. Mounting plates 15 are attached to the rails 13 and support a transversely extending structural member 16 of L section. The member 16 is arranged so that it faces or is open outwardly and upwardly as clearly shown in FIG. 3 in adjacent spanning relation to the conveyor end. A flat scraper plate or blade 17 is secured along the upper outer edge of the member 16 and extends therefrom at an upward inclination toward the conveyor 11. The blade has a very thin outer edge 18 which engages the conveyor along a line substantially from one side to the other and at a relatively small angular displacement from the top centerline of the drum to which the conveyor conforms.

The angle member 16 also supports a stationary comb designated generally by reference numeral 19 which fits against the open side of the member and is attached by means of bolts 20. This comb is shown as comprising a series of rectangular plates and alternating spacer blocks 21 of such reduced size and disposition that the outer portions of the plates form a series of regularly spaced teeth 22 coextensive with the scraper blade 17. As will be seen, again most clearly in FIG. 3, the upper edges of the plates or teeth 22 are in the same plane as the upper surface of the blade 17 and thus at the same inclination, with the teeth in effect forming an interrupted continuation of such surface.

A cylindrical rotor 23 having a center shaft 24 is rotatably supported by pillow blocks 25 attached to the rails 13 in adjacent parallel relation to the stationary comb 19. The rotor carries a multiplicity of radial pins 26 in such number and disposition in the illustrated embodiment that four pins in equal circumferential spacing successively pass through each space between the comb teeth 22 when the rotor is rotated and the plural sets of four such teeth are angularly displaced to define axially extending helices evident in FIG. 1. For a reason to be later explained, the ends of the pins 26 are acutely angled rearwardly with respect to the direction of rotation, so that the leading edge of each pin is longer than the trailing edge. The rotor is shown as being driven in a clockwise direction by a motor 27 having a drive sheave 28 and a belt 29 about this sheave and a sheave 30 secured to the rotor shaft 24.

The scraper blade 17 should be set at a slope which is just sufficient to overcome friction impeding the advance of the wax sheet 10 over its upper surface, the sheet of course being removed by the blade from conveyor 11. With too great an inclination, the material would tend to fall freely into the flaker and flakes of uneven size would be produced. In a production installation of such apparatus, it has been found that this angle can be within the range of from about 30° to about 40°, with the 30° angle preferred. The proper feed of the material is also influenced by the angular relation of the pins 26 and the stationary teeth 22 or the pin attack angle, since a pin with too great an attack angle will tend to drag the wax very quickly into the breaker at a speed which is actually too fast to provide uniformly sized flakes. This attack angle should not exceed 90° and preferably is quite small, for example, on the order of 5°, with the drawing showing a somewhat greater value for enhanced clarity.

As earlier noted, the pins 26 have inclined outer ends so that each is provided with a leading edge at a greater radial distance than its trailing edge. This pin end slope is significant in preventing the back or trailing edge of each pin from striking the advancing sheet and thereby eliminating interference with the smooth advance of the material which would otherwise occur. The particular value of the slope is determined by the speed at which the wax sheet advances and the time that it takes the end of the pin to pass the sheet in its rotation, and the angle can be within the range of from about 5° to about 30°, with an angle of about 16° preferred.

It will be readily appreciated that the illustrated embodiment of the new flaker is of economical construction and, with due observance to the relationships noted, this machine provides efficient flaking, for example, in converting a thin wax sheet to flakes of approximately soap-flake size.

Other modes of applying the principle of the invention may be employed, change being made as regards the details described, provided the features stated in any of the following claims or the equivalent of such be employed.

We, therefore, particularly point out and distinctly claim as our invention:

1. Apparatus for converting solid wax in a continuous sheet into flakes of predetermined substantially uniform size, comprising conveyor means for advancing the sheet, scraper blade means disposed tangentially to the path of said conveyor means and cooperating therewith for effecting removal of the sheet from said conveyor means, said scraper blade means being downwardly inclined so as to overcome friction impeding advance of said sheet but prevent uncontrolled fall of said sheet into a flaking area therebelow, a stationary comb at the discharge end of said scraper blade means defining a series of teeth spaced laterally across the width of said scraper blade means and extending in the direction of the advance of the sheet to receive the leading portion of the sheet, and rotor means cooperating with said comb to break the sheet into substantially uniform size flakes, a plurality of rows of radially extending cylindrical pins fixedly mounted on said rotor means, each of said rows of said pins being staggered relative to a radial plane through the longitudinal axis of rotation of said rotor means, said pins rotating through the spaces between the teeth and engaging the sheet portion supported on the latter at a relatively small attack angle thereby to effect the flaking without significant drag on the sheet by virtue of such pin engagement therewith.

2. Apparatus as set forth in claim 1, wherein the ends of the rotating pins are sloped rearwardly from the leading edges of the same which first engage the sheet at an angle such that their trailing edges do not strike the sheet.

3. Apparatus as set forth in claim 2, wherein the pin end slope is at an angle of from about 5° to about 30°.

References Cited

UNITED STATES PATENTS

| 1,224,960 | 5/1917 | Saecker | 241—223 X |
| 3,027,106 | 3/1962 | Brooks | 241—154 X |
| 1,440,429 | 1/1923 | Williams | 241—190 |
| 2,986,347 | 5/1961 | Stevenson | 241—190 X |
| 3,101,759 | 8/1963 | Sterner | 241—186 X |
| 3,186,651 | 6/1965 | Briolini | 241—195 X |

FOREIGN PATENTS

| 158,809 | 5/1957 | Sweden. |
| 1,200,212 | 12/1959 | France. |

LESTER M. SWINGLE, Primary Examiner

J. F. McKEOWN, Assistant Examiner

U.S. Cl. X.R.

241—190, 195